(12) United States Patent
Millar

(10) Patent No.: US 11,966,906 B2
(45) Date of Patent: Apr. 23, 2024

(54) TRANSFERS BASED ON USER ACTIVITY DATA

(71) Applicant: Joel Millar, Seahurst, WA (US)

(72) Inventor: Joel Millar, Seahurst, WA (US)

(*) Notice: Subject to any disclaimer, the term of this patent is extended or adjusted under 35 U.S.C. 154(b) by 114 days.

(21) Appl. No.: 17/668,245

(22) Filed: Feb. 9, 2022

(65) Prior Publication Data

US 2022/0270070 A1     Aug. 25, 2022

Related U.S. Application Data

(60) Provisional application No. 63/150,501, filed on Feb. 17, 2021.

(51) Int. Cl.
    *G06Q 20/32*            (2012.01)

(52) U.S. Cl.
    CPC .................. *G06Q 20/3223* (2013.01)

(58) Field of Classification Search
None
See application file for complete search history.

(56) References Cited

U.S. PATENT DOCUMENTS

| | | | | |
|---|---|---|---|---|
| 8,473,421 B2* | 6/2013 | Scalisi | ................ | G06Q 20/10 |
| | | | | 705/35 |
| 2015/0154667 A1* | 6/2015 | Hicks | ................ | G06Q 20/10 |
| | | | | 705/26.41 |
| 2016/0292746 A1* | 10/2016 | Kang | ................ | G06Q 30/0247 |
| 2019/0147505 A1* | 5/2019 | Blass | ................ | G06Q 20/10 |
| | | | | 705/36 R |
| 2019/0188658 A1* | 6/2019 | Largura | ................ | G06Q 20/085 |
| 2021/0082005 A1* | 3/2021 | David | ................ | G06Q 30/0279 |

OTHER PUBLICATIONS

"How political campaigns use your data, Oct. 12, 2020" (Year: 2020).*

\* cited by examiner

*Primary Examiner* — Kito R Robinson
*Assistant Examiner* — Toan Duc Bui
(74) *Attorney, Agent, or Firm* — Lee & Hayes P.C.

(57) ABSTRACT

A transfer platform can allow users to participate in campaigns based on one or more types of user activity data and corresponding activity values set by the users. The transfer platform can receive the user activity data from one or more sources, such as user devices and data source platforms. Based on received user activity data, and corresponding activity values, the transfer platform can determine transfer amounts to be transferred from one or more source accounts to one or more destination accounts. Accordingly, the transfer platform can implement transfers based on user activity data that indicates user engagement in one or more activity types.

16 Claims, 5 Drawing Sheets

TRANSFERS BASED ON USER ACTIVITY DATA

RELATED APPLICATIONS

This U.S. Patent Application claims priority to U.S. Provisional Patent Application No. 63/150,501, entitled "AUTOMATIC TRANSFERS BASED ON USER ACTIVITY," filed on Feb. 17, 2021, the entirety of which is incorporated herein by reference.

TECHNICAL FIELD

The present disclosure relates to determining transfer amounts, particularly with respect to determining transfer amounts based on user activity data received from one or more data sources.

BACKGROUND

Funds can be transferred between accounts. For example, transfers of funds can include outgoing transfers from an entity's account to another entity's account, incoming transfers from another entity's account to an entity's account, or transfers between two accounts associated with the same entity.

In some examples, such transfers may be associated with donations to charitable organizations, or transfers of funds to other destinations. For example, a user may want to donate funds to a charitable organization, and may cause a transfer of such funds from an account associated with the user to an account associated with the charitable organization.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Funds can be transferred from one account to another account. For example, a user may schedule an account transfer to transfer a particular amount of funds from an account associated with the user to an account associated with another entity, or to another account associated with the user. As another example, incoming transfers can be performed to transfer funds from another account to an account associated with a user.

However, in conventional systems such transfers must be directly scheduled by users, or otherwise be made based on direct user instructions that define the transfers. For example, such instructions in conventional systems may indicate a specific monetary amount to transfer, and specifically indicate when the transfer is to be performed. However, it may be difficult and/or inconvenient for users to remember to manually make or schedule such transfers. It may also be difficult and/or inconvenient to determine a specific value for such a transfer.

The example systems and methods described herein may be directed toward mitigating or overcoming one or more of the deficiencies described above. For example, the systems and methods described herein can automate transfers between accounts, and/or automatically determine corresponding transfer amounts, based on user activity data about one or more types of activities the user has engaged in during a period of time via one or more user devices and/or one or more data source platforms.

Figure 1:
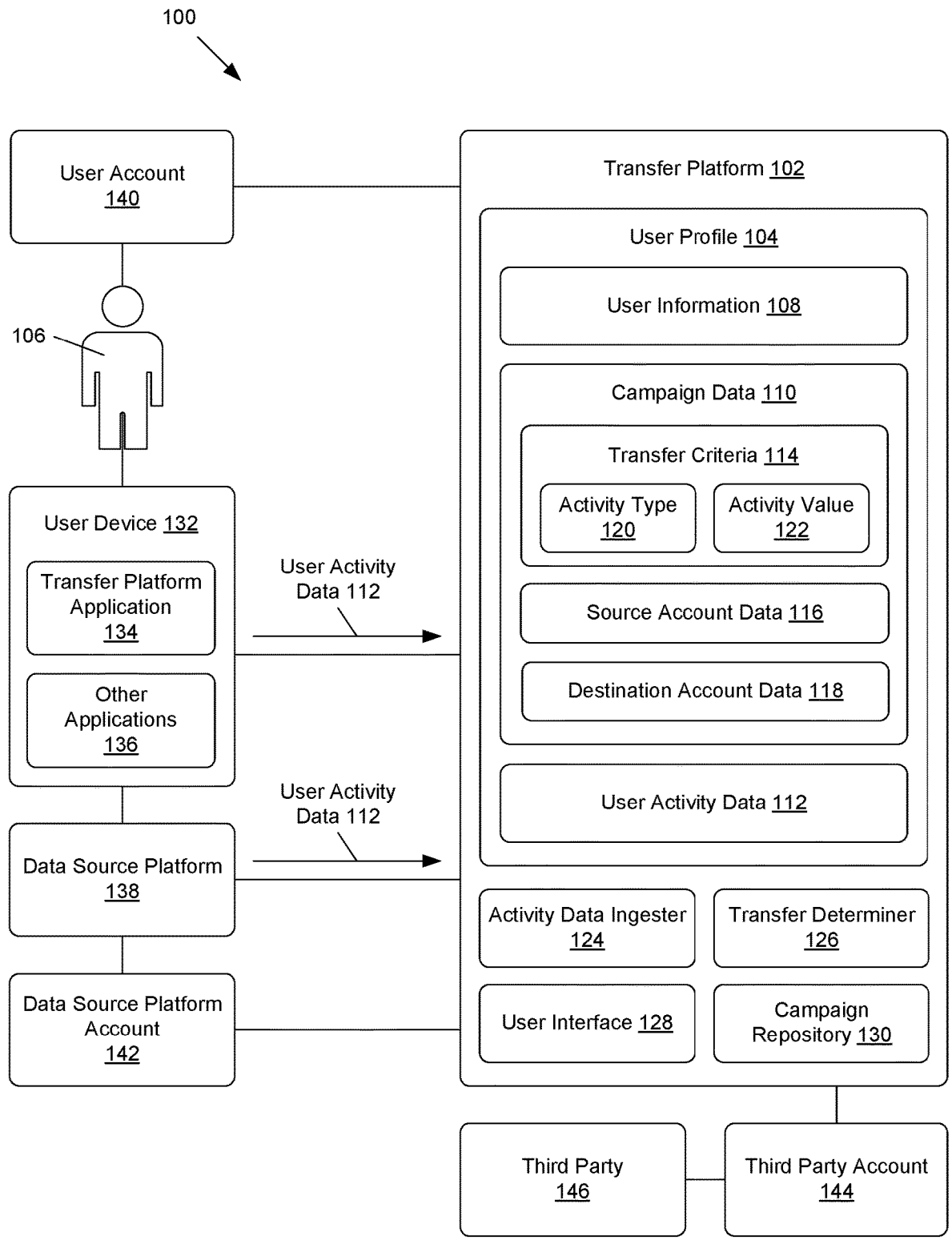
FIG. 1 shows an example of a transfer platform that is configured to implement transfers between accounts based on user activity received from one or more data sources.

FIG. 1 shows an example 100 of a transfer platform 102 that is configured to implement transfers between accounts based on user activity received from one or more data sources. The transfer platform 102 can store a user profile 104 indicating information associated with a user 106 of the transfer platform 102. For example, the user profile 104 can indicate user information 108, campaign data 110 associated with one or more campaigns that the user 106 participates in via the transfer platform 102, and/or user activity data 112. The campaign data 110 associated with a particular campaign can indicate transfer criteria 114 for the campaign, source account data 116 for the campaign, and destination account data 118 for the campaign. The transfer criteria 114 for a campaign can indicate at least one activity type 120 and a corresponding activity value 122. If the transfer platform 102 receives user activity data 112 associated with the activity type 120 from one or more data sources, the transfer platform 102 can determine a transfer amount based on the user activity data 112 associated with the activity type 120 and the corresponding activity value 122. The transfer platform 102 can also cause the determined transfer amount to be transferred from one or more source accounts indicated in the source account data 116 to one or more destination accounts indicated in the destination account data 118.

The transfer platform 102 can be executed by a computing system that includes one or more computing devices, such as servers or other computing devices. A non-limiting example of such a computing device is shown and described below with respect to FIG. 5. The transfer platform 102 can store the user profile 104 in a user profile database or other memory or digital storage. Although FIG. 1 shows the transfer platform 102 storing a single user profile associated with a single user, the transfer platform 102 can store user profiles associated with multiple different users of the transfer platform 102. The transfer platform 102 can also have other elements, such as an activity data ingester 124 configured to receive user activity data 112 from one or more data sources, a transfer determiner 126 configured to determine when transfers should occur and/or corresponding transfer amounts, a user interface 128, and/or a campaign repository 130 of information about pre-existing campaigns that users can choose to participate in via the transfer platform 102.

The activity data ingester 124 of the transfer platform 102 can be configured to receive the user activity data 112 associated with the user 106 from one or more data sources. For example, the activity data ingester 124 can be associated with at least one an application programming interface (API) or other interface that data sources can use to submit user activity data 112 to the transfer platform 102 via the Internet and/or other data networks. The user activity data 112 can be associated with at least one type of measurable user activity, and can reflect counts of instances of the user activity, a total amount of time that the user 106 has engaged in the user activity overall and/or during specific periods of time, and/or other user engagement metrics associated with the user activity.

In some examples, the user activity data 112 can be provided by one or more data sources associated with a user device 132. The user device 132 can be a device that is owned, operated, or otherwise associated with the user 106. For example, the user device 132 can be a smartphone or other cellular phone, a personal computer (PC), a tablet computer, a gaming console, a smart watch, a fitness tracker, a fitness device, a virtual reality (VR) device, an augmented reality (AR) device, a smart speaker, a vehicle, or any other device or equipment that can be configured to monitor and/or track data about one or more types of activities the user 106 can engage in. Although FIG. 1 shows a single user device 132, in some examples the user 106 may own, use, or otherwise be associated with multiple user devices, such as multiple types of user devices and/or multiple user devices of the same type. In these examples, data sources associated with different user devices can be configured to provide user activity data 112 associated with the user 106 to the transfer platform 102.

The one or more data sources associated with the user device 132, and/or multiple user devices, can provide the transfer platform 102 with user activity data 112 associated with at least one type of measurable user activity. The user activity data 112 provided by the data sources associated with the one or more user devices can also correspond with one or more activity types, such as the activity type 120, identified in the transfer criteria 114 for one or more campaigns indicated in the user profile 104.

In some examples, the user activity data 112 can be associated with at least one type of activity that the user 106 can engage in on, or via, the user device 132 or other user devices. In other examples, the user activity data 112 can be associated with at least one type of user activity that the user device 132 or one or more corresponding data sources can measure, monitor, and/or track. The user activity data 112 can, for example, indicate a number of times the user 106 engaged in a user activity, a number of times the user 106 performed a particular action associated with the user activity, an aggregate amount of time in which the user 106 engaged in the user activity, and/or other usage data associated with the user activity.

As an example, the user activity data 112 can indicate a number of emails that the user 106 has sent, via the user device 132, using one or more designated email accounts over a period of time. As another example, the user activity data 112 can indicate a number of phone calls made via the user device 132, or a total call time associated with phone calls made via the user device 132. In still other examples, the user activity data 112 can indicate a number of text messages sent via the user device 132, a duration of time during which one or more video games were played on the user device 132, a duration during which a target application was executing on the user device 132, amounts of time spent viewing streaming video on the user device 132, a number of mouse clicks received by the user device 132, a number of keystrokes received by the user device 132, a number of taps or other inputs received via a touchscreen of the user device 132, a number of steps taken by the user 106 that has been tracked by the user device 132, a number of songs played from a streaming music service via the user device 132, a number of user inquiries to a voice assistant executing on the user device 132, a number of miles driven by the user 106 that has been tracked by the user device 132, and/or any information about any other type of user activity tracked or monitored by the user device 132 or associated data sources.

The data sources associated with the user device 132 can include a transfer platform application 134 and/or other applications 136. The transfer platform application 134 can be provided by, and/or be associated with the transfer platform 102. For example, the transfer platform application 134 can be a mobile application, another type of downloadable and/or installable application, a web application that executes via a web browser executing on the user device 132, or another type of application associated with the transfer platform 102 that executes locally on the user device 132. The other applications 136 can include other applications or software, firmware, an operating system (OS) of the user device 132, and/or other types of applications or code that execute on the user device 132. In examples in which multiple user devices provide user activity data 112 to the transfer platform 102, individual user devices may execute versions of the transfer platform application 134 and/or other applications 136, or a transfer platform application on one user device may be configured to obtain user activity data from other applications 136 executing on one or more other user devices.

In some examples, the transfer platform application 134 can be a mobile application or other application that executes on the user device 132 and can use APIs, and/or other types of interfaces or connections, to interact with one or more of the other applications 136 executing on the user device 132, hardware elements of the user device 132, or other elements associated with the user device 132. For example, the transfer platform application 134 can be configured to receive user activity data 112 from an OS of the user device 132, as discussed further below. The transfer platform application 134 executing on the user device 132 can also be configured to interface with the transfer platform 102 over the Internet and/or other networks, for instance to transmit user activity data 112 to the transfer platform 102.

In some examples, the transfer platform application 134 can be configured to monitor and/or track one or more types of user activity data 112 on the user device 132 or other user devices, such as a type of user activity data 112 indicated by the activity type 120, and can report the user activity data 112 to the transfer platform 102. In other examples, one or more of the other applications 136 can be configured to monitor and/or track one or more types of user activity data 112 on the user device 132, but may expose that user activity data 112 to other applications via an API or other interface. Accordingly, in these examples, the transfer platform application 134 can obtain user activity data 112, such as user activity data 112 that corresponds to the activity type 120, from one or more of the other applications 136, and can send the obtained user activity data 112 to the transfer platform 102.

For example, the transfer platform application 134 can use OS information, API calls, and/or any other data or interface associated with local operations of the user device 132 and/or other applications 136 to obtain user activity data 112. The transfer platform application 134 can accordingly obtain user activity data 112, corresponding to one or more activity types indicated in transfer criteria 114, from other applications 136, and then provide the user activity data 112 to the transfer platform 102. For instance, if the activity type 120 is associated with phone calls made via the user device 132, the transfer platform application 134 may access phone call logs or other data stored by the OS of the user device 132, and/or use an API to access a phone dialer application that executes on the user device 132, to determine how many phone calls were made during a period of time, an aggregated duration of the phone calls, and/or any other data about phone calls made via the user device 132. Similarly, if the activity type 120 is a number of text messages sent, a duration of gaming time, a duration of any application usage, a number of mouse clicks, a number of keystrokes, a number of inputs received via a touchscreen, or any other type of user activity data 112, the transfer platform application 134 may be configured to access stored logs on the user device 132 associated with that activity type 120, or use API calls or other interfaces to retrieve corresponding user activity data 112 from the OS or other applications on the user device 132. In some examples, a user may use the transfer platform application 134, settings in the OS of the user device 132, and/or settings of individual applications to provide user permissions for the other applications 136 to share user activity data 112 with the transfer platform application 134 and/or the transfer platform 102.

As a non-limiting example, the user device 132 can be a smartphone, and one of the other applications 136 can be a health application that is installed on the smartphone. For instance, the health application can be a native application or operating system component, a downloadable application, or any other type of application that can be installed on the smartphone. The health application can be configured to collect health and fitness information about the user 106 from one or more sources. For example, the health application can collect workout information, counts of a number of steps taken by the user 106 each day, and/or other health and fitness information determined by the smartphone itself, other user devices linked to the smartphone, one or more other applications 136 linked to the health application, and/or other sources. In this example, the user activity data 112 can include daily step count information. The transfer platform application 134 can accordingly retrieve step count information from the health application via an API or other interface, and the transfer platform application 134 can then send the step count information to the transfer platform 102 as user activity data 112.

As another non-limiting example, one of the other applications 136 can be a vehicle application associated with a manufacturer of a vehicle operated by the user 106. The vehicle application can be configured to receive information from the vehicle over a wireless data connection, such as an indication of a number of miles driven by the vehicle. In this example, the vehicle application can receive an indication of miles driven by the vehicle, and the transfer platform application 134 can obtain the number of miles driven from the vehicle application. The transfer platform application 134 can accordingly provide the number of miles driven, as user activity data 112, to the transfer platform 102.

Overall, in some examples the transfer platform application 134 can collect user activity data 112 on the user device 132 directly, and/or from other applications 136 executing on the user device 132, and can provide the user activity data 112 to the transfer platform 102. For example, the transfer platform application 134 can use an API or other interface associated with the activity data ingester 124 to transmit the user activity data 112 to the transfer platform 102. Similarly, in some examples, one or more of the other applications 136 executing on the user device 132 can be data sources that are configured to determine or collect one or more types of user activity data 112, and to use an API or other interface associated with the activity data ingester 124 to directly transmit the user activity data 112 to the transfer platform 102.

In other examples, the activity data ingester 124 can periodically or occasionally request user activity data 112 from the transfer platform application 134, and/or from other applications 136 directly. For example, if one or more other applications 136 have APIs that expose user activity data 112 determined or maintained by the other applications 136, the activity data ingester 124 may use those APIs to request user activity data 112 that corresponds to activity types indicated in transfer criteria 114 directly from the other applications 136.

As discussed above, the transfer platform 102 can receive user activity data 112 associated with the user 106 from one or more user devices associated with the user 106, for instance from data sources such as the transfer platform application 134 and/or other applications 136 that can execute on user devices as discussed above. However, the data sources that provide user activity data 112 associated with the user 106 to the transfer platform 102 can also, or alternately, include one or more data source platforms, such as the data source platform 138 shown in FIG. 1. The data source platforms can be services, applications, companies, data repositories, or other platforms or entities that are separate from the user device 132, as discussed further below. Such data source platforms can provide the transfer platform 102 with user activity data 112 associated with at least one type of measurable user activity. The user activity data 112 provided by the data source platforms can also correspond with one or more activity types, such as the activity type 120, identified in the transfer criteria 114 for one or more campaigns indicated in the user profile 104.

The data source platforms, such as the data source platform 138 shown in FIG. 1, can be configured to monitor, measure, track, store, and/or maintain one or more types of user activity data 112. For example, the data source platforms can include social media platforms, cellular service providers, email service providers, computer or mobile application providers, video game platforms or gaming companies, media services, such as streaming video or music providers or other movie, television, and/or music sources, internet service providers, website operators, fitness companies, retailers, databases or other repositories of user activity data 112, or other entities, service providers, and/or platforms.

In some examples, the user 106 can be a registered user of, and/or have an account or membership with, data source platforms that can provide user activity data 112 to the transfer platform 102. In some examples, the user 106 can access one or more data source platforms via the user device 132 and/or other user devices. For instance, the user device 132 can be a smartphone, and the data source platform 138 can be a social media platform that the user 106 can access via an application or web browser installed on the smartphone.

In other examples, a data source platform can be a user data repository that stores one or more types of user activity data 112. The user data repository can be a blockchain, database, or other repository that stores user activity data 112 that is owned by the user 106, or is otherwise associated with the user 106. For example, the user 106 may use the user device 132 or another computing device to upload one or more types of user activity data 112 to the user data repository. As another example, the user 106 can instruct a social media platform, or other data source platform, to transfer user activity data 112 associated with the user 106 to the user data repository. Accordingly, the user data repository can be a data source platform that stores user activity data 112 owned by, and/or associated with, the user 106, and can provide the user activity data 112 to the transfer platform 102.

In some examples, the user 106 can provide the transfer platform 102 and/or the data source platforms with permissions to transfer one or more types of user activity data 112 from the data source platforms to the transfer platform 102, such as user activity data 112 associated with activity types identified in transfer criteria 114 indicated in the user profile 104. For instance, the user 106 may select the data source platform 138 via the user interface 128, and indicate that the user 106 wants to associate the data source platform 138 with the user profile 104 and/or with one or more campaigns. Selection of the data source platform 138 via the user interface 128 may launch a website or other interface associated with the data source platform 138, such that the user 106 can input his or her password or other login credentials for the data source platform 138 and grant permission for the data source platform 138 to provide one or more types of user activity data 112 to the transfer platform 102.

In some examples, as the user 106 uses a product or service associated with a data source platform, such as data source platform 138, and thereby engages in a user activity via the data source platform, the data source platform can collect corresponding user activity data 112. In other examples, a data source platform can receive user activity data 112 from another source, such that the data source platform can at least temporarily store the user activity data 112. As discussed above, the user activity data 112 can correspond to one or more activity types, such as activity type 120, associated with one or more campaigns that the user 106 is participating in via the transfer platform 102. A data source platform that has collected and/or received user activity data 112 can provide the user activity data 112 associated with the user 106 to the transfer platform 102, for instance on a periodic or occasional basis, or in response to a request from the transfer platform 102. As an example, the data source platform 138 can submit user activity data 112 about the user 106 to the activity data ingester 124 via an API or other interface. As another example, the transfer platform 102 can periodically or occasionally use an API associated with the data source platform to retrieve the user activity data 112 from the data source platform.

As an example, the data source platform 138 can be a cellular service provider, and the cellular network provider can send user activity data 112 to the transfer platform 102 that indicates an amount of cellular phone minutes used by the user 106 during a month or other period of time. As another example, the data source platform 138 can be a gaming company, and the gaming company can submit user activity data 112 to the transfer platform 102 that indicates an amount of time the user spent playing video games provided by the gaming company. In this example, the data source platform 138 may report user activity data 112 about games played via the user device 132, or via another gaming console, computer, cloud-based service, or other gaming platform or device separate from the user device 132. As still another example, the data source platform 138 can be an email service provider, and the email service provider can submit user activity data 112 to the transfer platform 102 that indicates a number of emails sent by the user during a period of time, via the user device 132 and/or via other computing devices. As yet another example, the data source platform 138 can be a social media platform, and the social media platform can submit user activity data 112 to the transfer platform 102 that indicates a number of posts made by the user 106 on the social media platform over a period of time, a number of "likes" or other interactions with the user's posts by other users of the social media platform, a number of "likes" or other interactions with other users' posts by the user 106 on the social media platform, or any other information associated with the user's account with the social media platform.

As discussed above, the transfer platform 102 can store the user profile 104 associated with the user 106. The user 106 can access the user interface 128 of the transfer platform 102 to register with the transfer platform 102, such that the transfer platform 102 creates and stores the corresponding user profile 104. For example, the user interface 128 can be a website associated with the transfer platform 102, such that a web browser executing on the user device 132 or another user device can access or load the website. As another example, the user interface 128 can be displayed via the transfer platform application 134 that executes on the user device 132.

The user profile 104 maintained by the transfer platform 102 can include user information 108 associated with the user 106, such as the user's name, contact information, login credentials, and/or other information. Such user information 108 can be provided by the user 106 via the user interface 128, for instance during registration with the transfer platform 102. In some examples, the user profile 104 can also store login credentials or other information associated with data source platforms the user 106 has already linked to the transfer platform 102, such that those data source platforms and corresponding activity types can be selected by the user 106 for use with any campaign going forward.

The transfer platform 102 can also store received user activity data 112 in association with the user profile 104. For example, the transfer platform 102 can store aggregated user activity data 112 and/or other user engagement metrics derived from user activity data 112 received over a period of time. The transfer platform 102 can, for example, store counts of instances of user activity, rather than the content of the user activity. For instance, if the user activity data 112 is associated with emails sent by the user 106, the transfer platform 102 can store a count of the number of emails sent by the user 106 over a period of time, rather than the content of the emails.

The user profile 104 can also indicate campaign data 110 associated with one or more campaigns that the user 106 is participating in via the transfer platform 102. As discussed above, the campaign data 110 for a particular campaign can indicate transfer criteria 114 associated with the campaign, source account data 116 associated with the campaign, and destination account data 118 associated with the campaign. The transfer criteria 114 can indicate at least one activity type 120 associated with the campaign, as well as the corresponding activity value 122 for each of the activity types. In some examples, the transfer criteria 114 for a campaign can indicate a single activity type and a single corresponding activity value. However, in other examples, the transfer criteria 114 for a campaign can indicate multiple activity types, as well as corresponding activity values for each activity type. As discussed further below, the activity value 122 associated with each activity type for a campaign can be set by the user 106, for instance via the user interface 128.

The transfer determiner 126 of the transfer platform 102 can be configured to determine if and/or when the user activity data 112 associated with the user 106 is associated with the transfer criteria 114 indicated in campaign data 110 for a campaign. The transfer determiner 126 can also use the user-defined activity value 122 associated with each activity type 120 indicated in the transfer criteria 114 to determine a transfer amount based on the user activity data 112. The transfer platform 102 can accordingly cause the transfer amount to be transferred from one or more source accounts identified in the source account data 116 to one or more destination accounts identified in the destination account data 118.

As a non-limiting example, the transfer criteria 114 associated with a campaign can indicate that the user 106 has selected an activity type of cell phone minutes for the campaign, and has assigned an activity value of $0.01 for each cell phone minute that the user 106 uses during telephone calls. In this example, user activity data 112 received from the user's smartphone, and/or from the user's cellular service provider or other data source platforms, can indicate a number of cell phone minutes used by the user 106 over a period of time. Accordingly, the transfer determiner 126 can determine a transfer amount based on the user-set activity value 122 for each cell phone minute, and the total number of cell phone minutes used over a period of time, and cause the transfer amount to be transferred from one or more source accounts to one or more destination accounts.

The source account data 116 associated with a campaign can indicate account numbers, names, and/or other identifiers of one or more source accounts that can be the source of funds for a transfer associated with the campaign. Similarly, the destination account data 118 associated with the campaign can indicate account numbers, names, and/or other identifiers of one or more destination accounts that can receive funds transferred from one or more source accounts in association with the campaign.

Source and/or destination accounts can be bank accounts, debit accounts, credit card accounts, investment accounts, retirement accounts, billing accounts with data source platforms, service providers, and/or the transfer platform 102, and/or other types of financial accounts. For example, a source account or a destination account can be a user account 140, associated with the user 106, with a bank or other financial institution. As another example, a source account or a destination account can be a data source platform account 142, associated with the data source platform 138, with a bank or other financial institution. As yet another example, a destination account can be a user's cellular phone bill or other type of service bill, such that funds transferred via the transfer platform 102 from one or more source accounts can at least partially pay off the user's bill. As yet another example, a source account or a destination account can be a third party account 144, associated with a third party 146, with a bank or other financial institution. In some examples, the third party 146 can be a charity or other organization that may or may not be associated with the user 106 and/or the data source platforms.

As a first non-limiting example, campaign data 110 for a campaign can indicate that the user account 140 is a source account for the campaign, and that the third party account 144 associated with the third party 146 is a destination account for the campaign. In this example, the third party 146 may be a charitable organization, and the user 106 may be participating in the campaign such that funds from the user account 140 can be transferred to the third party account 144 of the charitable organization based on amounts of one or more activity types the user 106 engages in over a period of time, as indicated by the user activity data 112. In some examples, the data source platform account 142 can also be a source account for the campaign, instead of or in addition to the user account 140. For instance, the data source platform 138 may be a company or other entity that agrees to donate funds from the data source platform account 142 to the third party account 144 of the charitable organization based on user activity data 112 associated with the user 106, or may match donations from the user account 140 to the third party account 144 based on user activity data 112 associated with the user 106.

As a second non-limiting example, campaign data 110 for a campaign can indicate that the data source platform account 142 is a source account for the campaign, and the user account 140 is a destination account for the campaign. In this example, funds can be transferred from the data source platform account 142 to the user account 140 based on the user's usage of the data source platform 138, and/or other types of user activity, indicated in user activity data 112. For instance, if the data source platform 138 is a social media platform, the transfer criteria 114 for the campaign may indicate an activity value, defined by the user 106, for each "like" of the user's posts on the social media platform by other users. Accordingly, the transfer platform 102 can cause funds to be transferred from the data source platform account 142 to the user account 140 based on the user-defined activity value 122 for each "like," and the total number of "likes" that the user's posts receive on the social media platform over a period of time.

When the transfer determiner 126 determines a transfer amount, based on user activity data 112 and transfer criteria 114, the transfer platform 102 can cause the transfer amount to be transferred from one or more source accounts to one or more destination accounts. In some examples, an owner or operator associated with the transfer platform 102, or a financial institution or service associated with the transfer platform 102, can withdraw or charge the transfer amount from the one or more source accounts, and can then deposit the transfer amount to the one or more destination accounts. In some examples, the owner or operator associated with the transfer platform 102, or the financial institution or service, can extract a service charge from the transfer amount received from one or more source accounts, and can deposit the transfer amount (minus the service charge) to the one or more destination accounts. In other examples, the transfer platform 102 can issue instructions to one or more banks or other financial entities associated with the one or more source accounts to transfer the designated transfer amount to the one or more destination accounts directly, or via one or more intermediate accounts.

Accordingly, when user activity data 112 received by the transfer platform 102, for instance from the user device 132, other user devices, and/or one or more data source platforms, corresponds with transfer criteria 114 for a campaign the user 106 is participating in, the transfer platform 102 can determine a transfer amount based on the user activity data 112 and the transfer criteria 114. For example, if the user activity data 112 indicates that the user 106 has played five hours of a video game during a month, and transfer criteria 114 of a campaign indicates that the user 106 wishes to donate $1.00 per hour of videogame playtime from the user account 140 to a third party account associated with a designated charity during that month, the transfer platform 102 can determine that $5.00 should be transferred from the user account 140 to the third party account associated with the designated charity. In some examples, if the data source platform 138 is matching donations to the designated charity as part of the campaign, the transfer platform 102 can determine that $5.00 should also be transferred from the data source platform account 142 to the third party account associated with the designated charity. Accordingly, although playing video games, or the specific video game played by the user 106, may be unrelated to the charity in this example, the user 106 can nevertheless cause the transfer platform 102 to implement a transfer from one or more source accounts to an account associated with the charity based on time the user spends playing video games.

In some examples, the transfer criteria 114 and/or other campaign data 110 for a campaign can indicate a duration of the campaign, transfer periods associated with the campaign, minimum and/or maximum amounts to be transferred overall and/or via individual transfers associated with the campaign, and/or any other information associated with the campaign. For example, the campaign data 110 for a campaign can indicate that transfers, determined based on aggregate user activity data 112 received each month and corresponding user-set values, will be performed monthly for a period of six months, or indefinitely until canceled by the user 106. As another example, the campaign data 110 for a campaign can indicate that the transfer platform 102 can perform transfers over a period of time based on the user activity data 112 until the total amount transferred reaches a maximum amount set by the user 106.

As discussed above, the user interface 128 can allow the user 106 to register with the transfer platform 102. The user interface 128 can also allow the user 106 to access, view, and/or edit campaign data 110 for one or more campaigns associated with the user 106, and/or to adjust or terminate participation in one or more campaigns. For example, during or after registration with the transfer platform 102, the user can choose to participate in a campaign, and can provide user input via the user interface 128 that defines the one or more activity types to be associated with the campaign, as well as user-set activity values associated with those activity types. The user-specified activity types, and corresponding user-set activity values, can be saved in transfer criteria 114 of campaign data 110 associated with the campaign. The user can also provide user input indicating at least one source account and at least one destination account for the campaign, such that corresponding information about the accounts can be saved as the source account data 116 and the destination account data 118 of campaign data 110 associated with the campaign.

In some examples, the transfer criteria 114 associated with a particular campaign can be associated with multiple activity types, and the user 106 can set activity values for each activity type independently. For instance, the user interface 128 can have fields, sliders, and/or other selectable options or user interface elements the user 106 can use to input activity types to be associated with the campaign, and to input corresponding activity values associated with those activity types. As a non-limiting example, the user 106 can set a particular campaign to be associated with a number of keystrokes logged on the user device 132, as well as a number of posts to a social media account associated with a particular data source platform. In this example, the user 106 can set a first activity value to be associated with each keystroke, and can set a set second activity value to be associated with each social media post.

Additionally, although in some examples a campaign can be associated with a single source account and a single destination account, in other examples a campaign can be associated with multiple source accounts and/or multiple destination accounts. In these examples, the user interface 128 can allow the user 106 to specify percentages of the transfer amount that should be drawn from each source account, and/or that should be provided to each destination account. As a non-limiting example, a particular campaign may be associated with five distinct charities, such that the destination accounts for the campaign are five separate third party accounts associated with the five distinct charities. In this example, the user interface 128 may default to indicating that each of the five charities will receive 20% of the total transfer amount. However, the user interface 128 may allow the user 106 to adjust these default percentages, for instance to increase or decrease percentages of the total transfer amount that individual charities will receive.

In some examples, the user interface 128 can display information associated with pre-existing campaigns stored in the campaign repository 130, such that the user 106 can choose to participate in any of the pre-existing campaigns. For a particular pre-existing campaign, the user interface 128 can display information about entities associated with the campaign, such as one or more third parties to which funds can be transferred based on the campaign. The user interface 128 may also display information associated with a purpose or theme of the campaign, a number of users who are participating in the campaign, a total amount of funds transferred to one or more destination accounts to date in association with the campaign, and/or other information associated with the campaign. In some examples, the user interface 128 can allow the user 106 to search for pre-existing campaigns, filter pre-existing campaigns, view pre-existing campaigns by category, view recently added pre-existing campaigns, view a list of the most popular pre-existing campaigns, and/or otherwise find pre-existing campaigns that may be of interest to the user 106.

The user 106 may choose to join a pre-existing campaign based on the information displayed in the user interface 128. In some examples, the user 106 can also edit settings associated with the pre-existing campaign, for instance by adjusting default percentages of transfer amounts for multiple destination accounts associated with the pre-existing campaign, editing the source account data 116 associated with the pre-existing campaign, adjusting activity types the user wants to use to determine transfer amounts for the pre-existing campaign, adjusting activity values associated with those activity types, entering source account data 116 associated with one or more accounts the user 106 wants to be the source of funds for transfers performed based on the user's participation on in the campaign, and/or other settings. If the user 106 accepts default settings and/or changes any settings associated with the pre-existing campaign, the settings for the campaign chosen and/or accepted by the user 106 can be stored as campaign data 110 associated with the user 106.

As a non-limiting example, the campaign repository 130 can include information about a pre-existing "Cleaning the Pacific Ocean" campaign associated with one or more designated third parties that engage in and/or support clean-up operations in the Pacific Ocean. In this example, the user interface 128 can present information stored in the campaign repository 130 about the purpose of the campaign and the third parties that, by default, would receive transfers of funds based on the campaign. If the user 106 chooses to join the pre-existing campaign, the user interface 128 may display corresponding default campaign information, such as default activity types that will be used to determine transfer amounts, and/or default activity values for each activity type. However, in some examples, the user interface 128 can also allow the user 106 to change any of the default settings, such as changing the activity types to be associated with the user's participation in the pre-existing campaign, changing the activity values associated with the activity types, and/or changing the percentages of transfer amounts each of the third parties will receive based on the user's participation in the campaign. The user 106 may also designate one or more source accounts for the user's participation in the campaign, such as the user account 140. In some examples, the user 106 can also edit a list of destinations associated with the campaign, for instance to remove one or more of the default third parties associated with the campaign, and/or to add information about one or more additional destination accounts that are to receive at least a portion of funds transferred based on the user's participation in the campaign.

In some examples, the user interface 128 may also allow the user 106 to define new custom campaigns. For instance, the user 106 can select one or more activity types to associate with a new campaign, select activity values corresponding to the selected activity types, designate one or more source accounts for the new campaign, and designate one or more destination accounts for the new campaign. The information provided by the user 106 about the new campaign can be stored as campaign data 110 associated with the user 106. Additionally, in some examples, when the user 106 creates a new custom campaign, information associated with the new campaign can be added to the campaign repository 130 as a new pre-existing campaign. Accordingly, other users of the transfer platform 102 can view information about the new custom campaign via the user interface 128, and can have the option to join the new custom campaign. In some examples, the transfer platform 102 can also create a link to a new custom campaign created by the user 106, such that the user 106 can share the link with friends and other contacts via email, social media, and/or other communication methods to invite the friends and contacts to join the new custom campaign.

Figure 2:
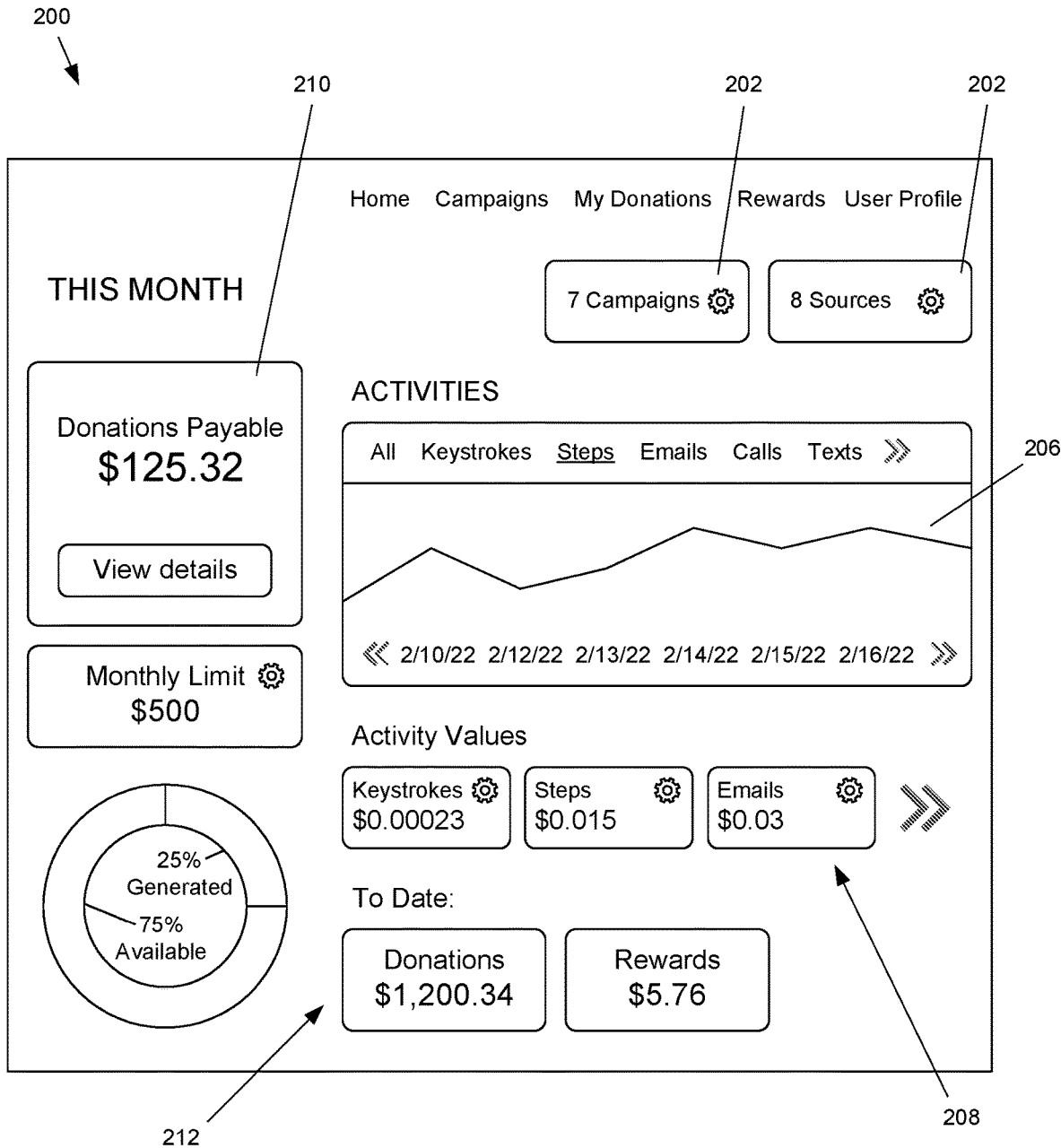
FIG. 2 shows an example of a dashboard that can be shown via a user interface of the transfer platform.

The user interface 128 can additionally have a dashboard, or other view or screen, that allows the user 106 to view statistics about current campaigns the user 106 is participating in, historical metrics associated with the user's participation in current and/or previous campaigns over time, and/or other information associated with campaigns. FIG. 2, discussed further below, shows an example of such a dashboard that can be shown in the user interface 128.

Overall, the user 106 can use the transfer platform 102 to participate in one or more campaigns associated with corresponding campaign data 110. The user 106 can set the transfer criteria 114 for each campaign, such as one or more designated activity types the user 106 wants to associate with the campaign, and user-set activity values for each of the activity types. The transfer platform 102 can periodically or occasionally determine transfer amounts based on user activity data 112 associated with the designated activity types, received from one or more data sources, and corresponding activity values for the designated activity types. The transfer platform 102 can cause corresponding transfers to be made from one or more source accounts to one or more destination accounts identified in the campaign data 110.

Accordingly, the transfer platform 102 can cause funds to be transferred between source accounts and destination accounts based on user activity data 112 associated with the user 106, even though the user activity data 112 may be unrelated to the source accounts and/or the destination accounts. As a non-limiting example, the user 106 may choose to have the transfer platform 102 implement a monthly transfer from the user account 140 to accounts of one or more designated ocean clean-up charities based on an amount of keystrokes entered by the user 106 into the user device 132, and based on an activity value set by the user 106 for each keystroke, even though the user activity of entering a keystroke on the user device 132 is not directly related to ocean clean-up operations or the designated ocean clean-up charities. As such, unlike conventional systems in which a user may have to manually preschedule transfers of funds and/or indicate specific transfer amounts, the transfer platform 102 can implement transfers between accounts based on transfer amounts that the transfer platform 102 dynamically determines based on otherwise unrelated user activity data 112 and corresponding user-set activity values for the user activity data 112.

FIG. 2 shows an example of a dashboard 200 that can be shown to the user 106 via the user interface 128 of the transfer platform 102. The dashboard 200 can display multiple types of information associated with the user's current and/or historical participation in one or more campaigns via the transfer platform 102. The dashboard 200 can also allow the user 106 to edit settings associated with the user's participation in campaigns.

The dashboard 200 can have a campaign element 202 associated with campaigns the user 106 is currently participating in, and/or has historically participated in. For instance, the campaign element 202 can indicate a number of campaigns that the user has participated in. The campaign element 202 may also, or alternately, be a link or other user interface element that allows the user 106 to view and/or adjust settings associated with the campaigns, for instance to change the activity types and/or activity values associated with the campaigns.

The dashboard 200 can also have a source element 204 associated with one or more data sources that provide, or can provide, user activity data 112. For example, the source element 204 can indicate how many data source platforms the user 106 has permitted to provide user activity data 112 to the transfer platform 102, how many other applications 136 and/or other data sources the user 106 has permitted the transfer platform application 134 to access to obtain user activity data 112, and/or any other data sources that the user 106 has linked to the transfer platform 102. The source element 204 may also, or alternately, be a link or other user interface element that allows the user 106 to view and/or adjust settings associated with the data sources of user activity data 112, for instance to change or terminate permission associated with individual data sources, or to link new data source platforms, other applications 136, or other data sources to the transfer platform 102.

The dashboard 200 can also have an activity chart 206. The activity chart 206 can indicate counts or other metrics associated with one or more activity types, in the user activity data 112 received by the transfer platform 102 from one or more data sources, over a period of time. The user 106 can accordingly view the activity chart 206 to determine how often the user engages in the one or more activity types. In some examples, the user 106 may determine to adjust the activity types and/or activity values associated with one or more campaigns based on information the user 106 learns from the activity chart 206. For instance, if the activity chart 206 indicates that the user 106 has been engaging in a particular activity type more often than the user expected, the user 106 may use the user interface 128 to raise or lower the activity value for that particular activity type in association with one or more campaigns.

The dashboard 200 can also display activity value information 208 indicating the user-set activity value 122 for each activity type 120. As a non-limiting example, the activity value information 208 can indicate a first user-set activity value for each keystroke counted based on user activity data 112 received from the user device 132, a second user-set activity value for each step counted based on user activity data 112 received from the user device 132 or another data source, and a third user-set activity value for each sent email counted based on user activity data 112 received from the user device 132 and/or an email service. The activity value information 208 can also include links or other user interface elements that allow the user 106 to adjust the activity value 122 for each activity type 120. In some examples, the activity value information 208 can also allow the user 106 to set different activity values for the same activity type, for instance in association with different campaigns.

The dashboard 200 can also indicate transfer period data 210 associated with a current month, or other time period. For example, the transfer period data 210 can indicate a current transfer amount that the transfer platform 102 has determined for the current month based on user activity data 112 associated with one or more activity types, and the corresponding activity values, associated with one or more campaigns. The transfer period data 210 may also indicate a maximum transfer amount the user 106 has set for the current transfer period, such as a monthly limit on transfers set by the user 106. The transfer period data 210 may also include a chart, graph, or other visual indication of the current transfer amount relative to the maximum transfer amount.

The dashboard 200 can also indicate historical transfer data 212 associated with the user's participation in current and/or past campaigns. As a non-limiting example, the historical transfer data 212 can indicate a total amount of donations that the transfer platform 102 has transferred, based on user activity data 112 and transfer criteria 114 associated with campaigns, from the user account 140 to third-party accounts of charitable organizations or other destination accounts. The total amount of donations may also indicate a total amount of matching donations transferred from one or more data source platforms. As another example, the historical transfer data 212 can indicate an amount of rewards transferred from data source platform accounts or other accounts to the user account 140, or applied to one or more bills or service charges incurred by the user 106, based on user activity data 112 and transfer criteria 114 associated with campaigns.

Overall, the dashboard 200 can display current and/or historical information associated with the user profile 104, campaign data 110, received user activity data 112, sources and/or types of user activity data 112, pending and/or historical transfers, and/or other information associated with the user 106. The user 106 can use the dashboard 200 to view information about the user's participation in campaigns, adjust settings associated with campaigns, enroll in new campaigns, and/or otherwise interact with the transfer platform 102. The dashboard 200 can also have links to other portions of the user interface 128, such as a link to a page associated with management of the user profile 104, a link to a page where information from the campaign repository 130 about pre-existing campaigns can be viewed, and/or other links.

Figure 3:
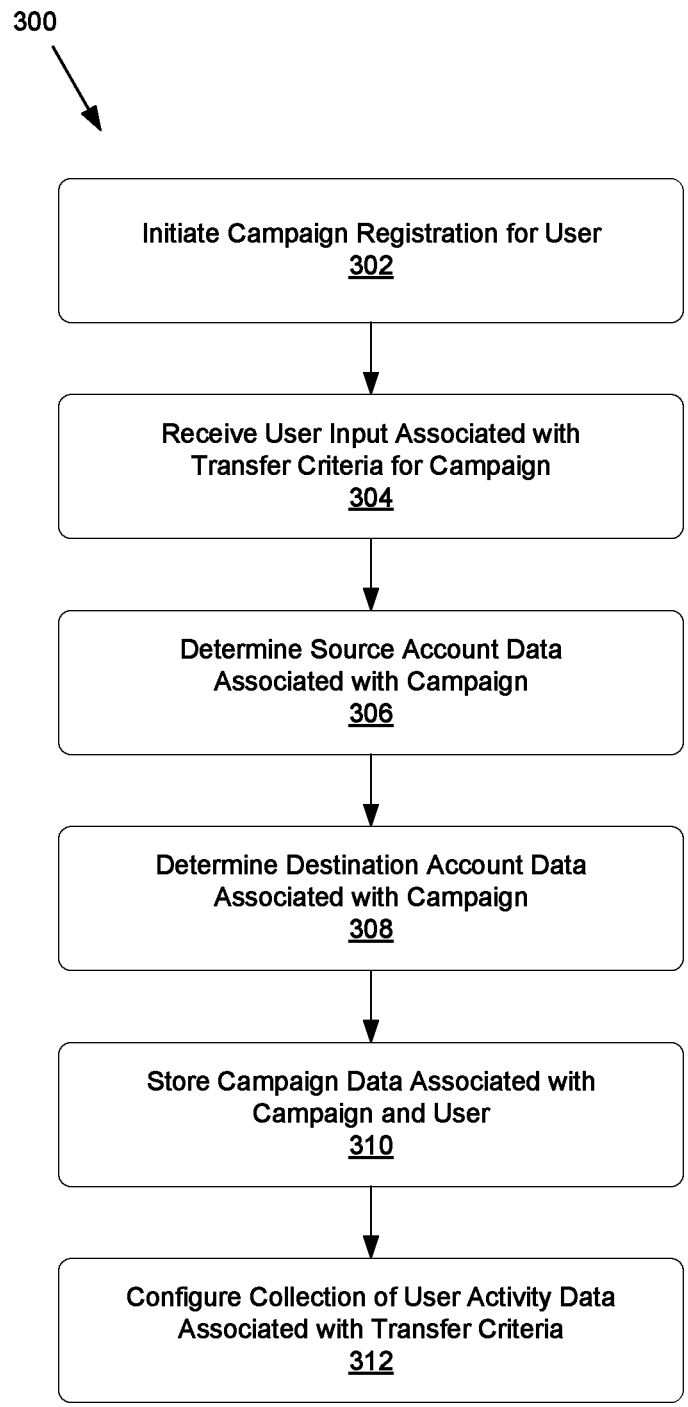
FIG. 3 shows a flow chart of an example process by which a user can participate in a campaign via the transfer platform.

FIG. 3 shows a flow chart of an example process 300 by which the user 106 can participate in a campaign via the transfer platform 102. As discussed above, the user 106 can have registered with the transfer platform 102, and the transfer platform 102 can maintain the user profile 104 associated with the user 106. For example, the user 106 can log into the transfer platform 102 via a website, via the transfer platform application 134, or otherwise access the user interface 128 to register and provide user information 108, such as the user's name, phone number, email address, and/or other information.

At block 302, the transfer platform 102 can initiate a campaign registration for the user 106. For example, the user 106 can provide user input via the user interface 128 indicating that the user 106 would like to participate in a campaign, such as a new custom campaign or an existing campaign selected from the campaign repository 130.

At block 304, the transfer platform 102 can receive user input associated with the transfer criteria 114 for the campaign. For example, the user 106 can provide user input via the user interface 128 indicating the activity type 120 to be associated with the user's participation in the campaign, as well as the activity value 122 associated with the activity type 120. In some examples, the user 106 may select multiple activity types in association with the campaign, and may select the same or different activity values for each of the activity types.

In some examples, the user interface 128 may present a predetermined list of activity types, and the user 106 can select one or more activity types from the predetermined list at block 304. As an example, the user interface 128 can present a list of activity types corresponding with user activity data 112 that the transfer platform application 134 is configured to obtain by itself and/or via integration with one or more other applications 136. Accordingly, the user can select one or more of the activity types from the predetermined list at block 304.

As another example, the user interface 128 can present a list of data source platforms that can be linked with the transfer platform 102, such that the user 106 can select one or more data source platforms, and/or activity types associated with the data source platforms, at block 304. In some of these examples, the user 106 may also enter login credentials, a membership number, or other information by which the user 106 is known to a selected data source platform, for instance to grant permission for data source platform to share corresponding user activity data 112 with the transfer platform 102. The user 106 may enter such data sharing permission information in the user interface 128 of the transfer platform 102, and/or a website or other interface associated with the data source platform. Alternatively, if the user 106 has previously linked a data source platform with the transfer platform 102 by providing login credentials and data sharing permissions to the data source platform and/or the transfer platform 102, the user 106 may select the pre-linked data source platform to associate the data source platform and/or one or more corresponding activity types with the campaign without re-entering login credentials or granting new data sharing permissions.

As noted above, the transfer criteria 114 entered by the user 106 for the campaign at block 304 can also define an activity value for each activity type selected by the user 106, such as a value to be transferred per unit of a particular type of user activity data 112 received from a selected data source platform or the user device 132. As non-limiting examples, the transfer criteria 114 can indicate that the user 106 desires to transfer $0.01 per cell phone minute the user 106 uses, that the user 106 desires to transfer $1.00 per hour of video game play on the user device 132 or on a selected data source platform, that the user 106 desires to have $0.05 per text message sent from the user device 132, and/or any other transfer criteria 114.

At block 306, the transfer platform 102 can determine source account data 116 to be associated with the campaign.

The source account data 116 can identify one or more source accounts from which funds can be drawn when a transfer is performed in association with the campaign. In some examples, if a source account for the campaign is to be the user account 140, the user 106 can enter bank account information or other information associated with the user account 140, or the user 106 can indicate that information about the user account 140 already stored in the user information 108 should be used as the source account data 116 for the campaign. In other examples, the source account data 116 may identify one or more default source accounts for the campaign, or one or more source accounts selected from a list by the user 106. For instance, the source account data 116 may be associated with a data source platform account of a default data source platform that has agreed to match user donations as part of a campaign, or a data source platform account of a data source platform that the user 106 selects from a list of data source platforms that have agreed to match user donations. In some examples, if there are multiple source accounts, the user 106 may accept default percentages or adjust percentages that indicate how much of an overall transfer amount should be drawn from each source account.

At block 308, the transfer platform 102 can determine destination account data 118 to be associated with the campaign. The destination account data 118 can identify one or more destination accounts that can receive transferred funds when a transfer is performed in association with the campaign. Similar to block 306, the user 106 may enter account details associated with one or more destination accounts at block 308, or select one or more destination accounts from a list. For instance, the user 106 may indicate that one or more selected charitable organizations should receive funds transferred in association with the campaign, and the transfer platform 102 can use pre-stored information associated with corresponding third party accounts as the destination account data 118 for the campaign. In some examples, if there are multiple destination accounts, the user 106 may accept default percentages or adjust percentages that indicate how much of an overall transfer amount should be delivered to each destination account.

At block 310, the transfer platform 102 can store campaign data 110 for the campaign in association with the user profile 104. For example, the campaign data 110 can indicate the transfer criteria 114 entered at block 304, the source account data 116 determined at block 306, and the destination account data determined at block 308.

At block 312, the transfer platform 102 can configure the collection of user activity data 112 associated with the activity types selected as part of the transfer criteria 114 at block 304. As an example, if the user 106 selected an activity type associated with the user device 132, the transfer platform 102 can send a configuration file or other instructions to the transfer platform application 134 on the user device 132 to configure the transfer platform application 134 to obtain and return the corresponding user activity data 112. As another example, if the user 106 selected an activity type associated with a particular data source platform, the transfer platform 102 can send a notification to the particular data source platform to request that that data source platform provide the corresponding user activity data 112 associated with the user 106 to the transfer platform 102.

After the campaign has been set up via process 300, the user can engage in any of the activity types associated with the campaign via the user device 132, other user devices, and/or one or more data source platforms. In some examples, the transfer platform 102 can set up multiple campaigns associated with the same user by repeating process 300. Thereafter, the user can engage in one or more activity types associated with one or more campaigns over a period of time, such as by cell phone calls, playing video games, send emails, posting on social media, or engaging in any other activity type associated with a campaign. The user device 132, other user devices, and/or one or more data source platforms can provide corresponding user activity data 112 to the transfer platform 102, which the transfer platform 102 can use to perform transfers as discussed further below with respect to FIG. 4.

Figure 4:
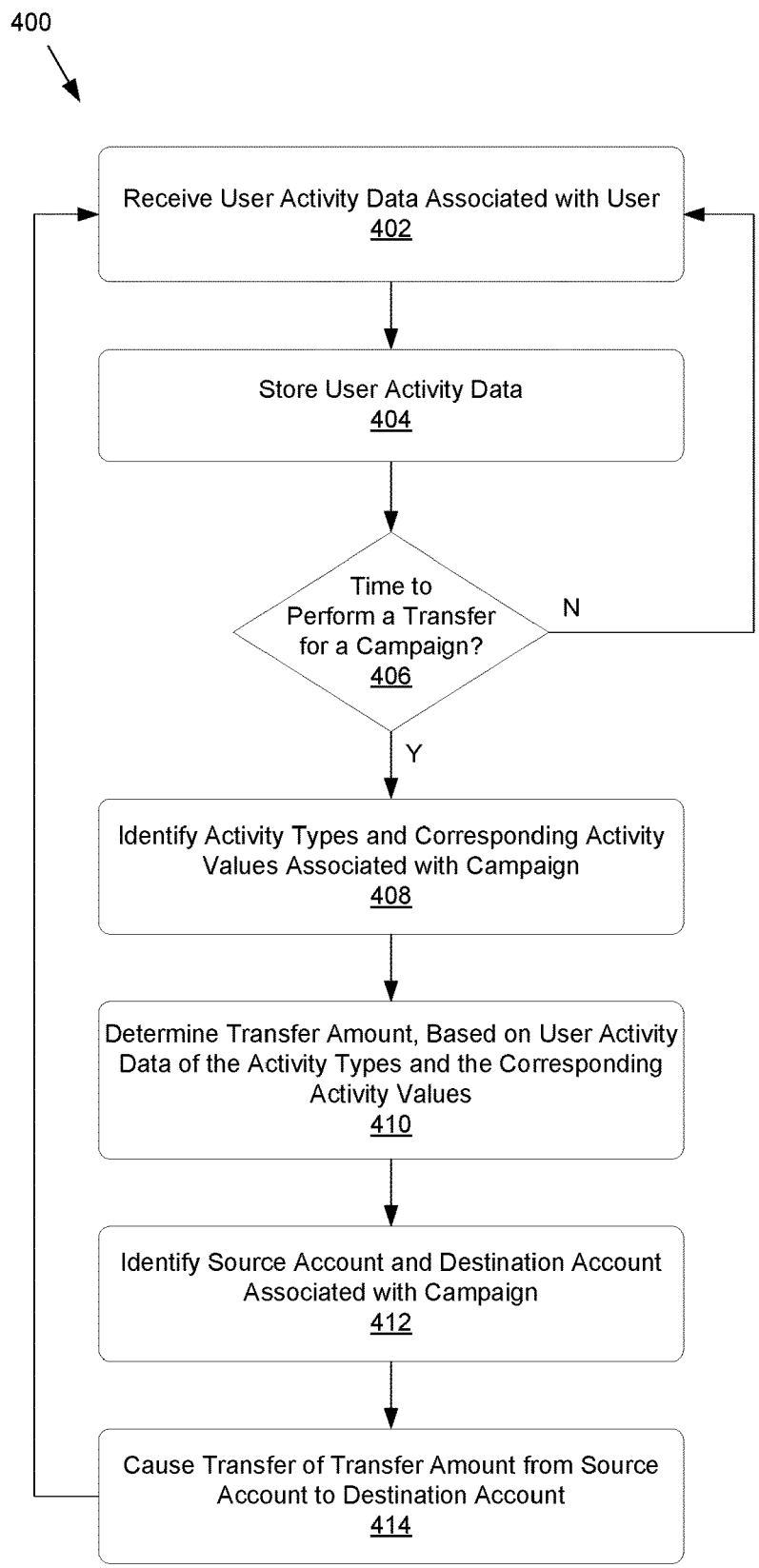
FIG. 4 shows a flow chart of an example process the transfer platform can use to perform a transfer of a transfer amount based on a campaign and user activity data.

FIG. 4 shows a flow chart of an example process 400 the transfer platform 102 can use to perform a transfer of a transfer amount based on a campaign and user activity data 112. As discussed above with respect to FIG. 3, the user 106 can have registered with the transfer platform 102, and can have provided information associated with a campaign that the user 106 desires to participate in. For instance, the user 106 can have indicated at least one activity type 120 associated with the campaign, a corresponding activity value 122 for each activity type 120, source account data 116, and destination account data 118.

At block 402, the transfer platform 102 can receive user activity data 112 associated with the user 106 from one or more data sources. The user activity data 112 can, for example, be received from the user device 132, other user devices, and/or one or more data source platforms. Data sources associated with the user device 132, the other user devices, and/or the data source platforms can have been configured to provide user activity data 112 corresponding to the one or more activity types associated with the campaign, as described above with respect to FIG. 3. As an example, the transfer platform application 134 can have been configured to monitor the user's usage of the user device 132 for instances in which the user 106 engaged in activity corresponding with the one or more one or more activity types associated with the campaign, such as the user making cell phone calls, playing video games, sending emails, sending text messages, or engaging in any other type of user activity. The transfer platform application 134 may monitor the user's usage of the user device 132 to detect instances of the user 106 engaging in the activity types associated with the campaign in real-time, and/or may periodically or occasionally use API calls, stored data logs, or other techniques to obtain user activity data 112 associated with activity types.

At block 404, the transfer platform 102 can store the user activity data 112 received at block 402. In some examples, the transfer platform 102 can store the user activity data 112 by incrementing or otherwise updating a counter associated with an activity type based on the user activity data 112 received at block 402. For example, if an activity type associated with the campaign is a number of text messages sent per month, the transfer platform 102 can increment a counter of the number of text messages sent during the current month based on user activity data 112 indicating how many text messages the user 106 has sent during the current month since the counter was last updated.

At block 406, the transfer platform 102 can determine whether it is time to perform a transfer associated with the campaign. The campaign data 110 associated with the campaign may indicate that transfers are to be performed on a periodic basis, such as once a week or once a month, or in response to a particular condition or a trigger event. The transfer platform 102 can accordingly use the campaign data 110 to determine if a transfer is to be performed. If it is not yet time to perform a transfer associated with the campaign (Block 406—No), the transfer platform 102 can continue receiving and storing user activity data 112 at blocks 402 and 404.

However, if it is time to perform a transfer associated with the campaign (Block 406—Yes), the transfer platform 102 can identify the one or more activity types and corresponding activity values associated with the campaign at block 408. For example, the transfer platform 102 can identify the transfer criteria 114 in campaign data 110 associated with the campaign.

At block 410, the transfer platform 102 can determine a transfer amount, based on the user activity data 112 stored at block 404 that corresponds to the one or more activity types indicated by the transfer criteria 114, and the activity values corresponding with those one or more activity types indicated by the transfer criteria 114. For example, based on transfer criteria 114 indicating that the user 106 has chosen to transfer $0.01 per email sent, and the user activity data 112 indicates that the user sent five hundred emails via a data source platform and/or via the user device 132 during a monthly period, the transfer platform 102 can determine that the transfer amount is $5.00.

At block 412, the transfer platform 102 can determine the source account data 116 and the destination account data 118 associated with the campaign, based on the campaign data 110. The source account data 116 can indicate one or more source accounts from which the transfer amount determined at block 410 should be drawn. The destination account data 118 can indicate one or more destination accounts to which the transfer amount determined at block 410 should be delivered. In some examples, the source account data 116 and/or the destination account data 118 may indicate percentages associated with multiple source accounts and/or multiple source accounts, indicate that a source account will match some or all of the transfer amount transferred from another source account, and/or otherwise indicate information about how the transfer is to be processed.

At block 414, the transfer platform 102 can use the source account data 116 and the destination account data 118 to cause a transfer of the transfer amount from one or more source accounts to one or more destination accounts. For example, the transfer platform 102 can instruct one or more financial institutions or services to withdraw the transfer amount from a source account, and deliver the transfer amount to a destination account. In some examples the transfer platform 102 may send a confirmation email, text message, or other notification to the user 106 prior to the transfer, to notify the user 106 of the pending transfer and/or to request user approval of the transfer before the transfer is performed.

After causing the transfer associated with the campaign at block 414, the transfer platform 102 can return to block 402 to continue receiving user activity data 112 associated with the same campaign and/or different campaigns. For example, the transfer platform 102 may implement process 400 for different campaigns in parallel or in series. As another example, the transfer platform 102 may receive user activity data 112 at block 402 that is associated with multiple campaigns, and then determine which portions of the user activity data 112 are relevant to a particular campaign at block 408 when a transfer associated with that particular campaign is to be performed.

Overall, the processes shown in FIGS. 3 and 4 can cause the transfer platform 102 to dynamically determine transfer amounts and implement transfers between one or more source accounts and one or more destination accounts, based on user activity data 112 associated with the user 106. The transfer platform 102 can accordingly automatically determine transfer amounts for transfers based on user activity data 112 received from data sources such as the user device 132, other user devices, and/or one or more data source platforms, even though the user activity data 112 may be associated with types of user activities that may not conventionally be associated with transfers, a source account, and/or a destination account. The systems and methods described herein can also enable users to designate such transfers to be directed toward a myriad of purposes, such as payment of service fees and/or technology charges associated with the transfer platform 102, charitable donations, investment purposes, payment of service accounts, and/or any other purpose.

Figure 5:
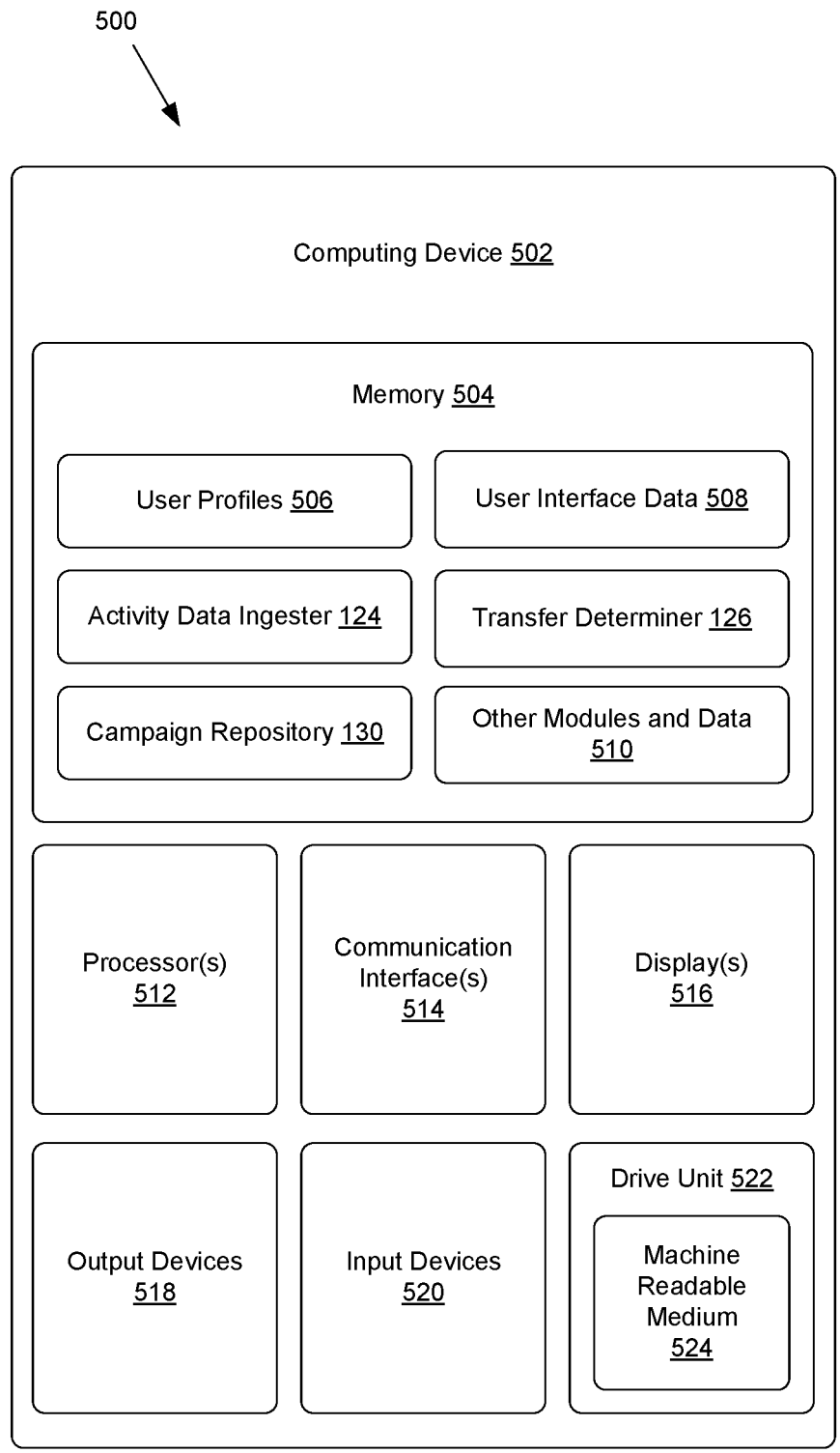
FIG. 5 shows an example system architecture for a computing device associated with the transfer platform.

FIG. 5 shows an example system architecture 500 for a computing device 502 associated with the transfer platform 102 described herein. In some examples, the computing device 502 may be a server, computer, or other type of computing device or computing system that executes at least a portion of the transfer platform 102 remotely from the user device 132 and/or data source platforms. In some examples, elements of the transfer platform 102 can be distributed among, and/or be executed by, multiple computing devices. For example, the transfer platform application 134 can be considered a part of the transfer platform 102, and the user device 132 can be a computing device that executes the transfer platform application 134 on the user device 132 separately from one or more remote computing devices that execute other elements of the transfer platform 102.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store user profiles 506, such as the user profile 104 associated with the user 106 and/or other user profiles associated with other users of the transfer platform 102. The memory 504 can also store user interface data 508 associated with the rendering and display of the user interface 128 of the transfer platform. The memory 504 can additionally store data and/or computer-executable instructions associated with the activity data ingester 124, the transfer determiner 126, and/or the campaign repository 130 discussed above. The memory 504 can also store other modules and data 510 that be utilized by the computing device 502 to perform or enable performing any other action associated with the computing device 502 and/or the transfer platform 102. For instance, the other modules and data 510 can include a platform, operating system, and applications, and data utilized by the platform, operating system, and applications.

The computing device 502 can also have processor(s) 512, communication interfaces 514, displays 516, output devices 518, input devices 520, and/or a drive unit 522 including a machine readable medium 524.

In various examples, the processor(s) 512 can be a central processing unit (CPU), a graphics processing unit (GPU), both a CPU and a GPU, or any other type of processing unit. Each of the one or more processor(s) 512 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 512 may also be responsible for executing computer applications stored in the memory 504, which can be associated with types of volatile (RAM) and/or nonvolatile (ROM) memory.

The communication interfaces 514 can include transceivers, modems, interfaces, antennas, telephone connections, and/or other components that can transmit and/or receive data over networks, telephone lines, wireless data connections, or other connections. For example, the activity data ingester 124 can be associated with one or more APIs that allow data sources to provide user activity data 112 to the transfer platform 102, and the computing device 502 can receive the user activity data 112 via the communication interfaces 514.

The display 516 can be a liquid crystal display or any other type of display commonly used in computing devices. For example, a display 516 may be a touch-sensitive display screen, and can then also act as an input device or keypad, such as for providing a soft-key keyboard, navigation buttons, or any other type of input.

The output devices 518 can include any sort of output devices known in the art, such as a display 516, speakers, a vibrating mechanism, and/or a tactile feedback mechanism. Output devices 518 can also include ports for one or more peripheral devices, such as headphones, peripheral speakers, and/or a peripheral display.

The input devices 520 can include any sort of input devices known in the art. For example, input devices 520 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 524 can store one or more sets of instructions, such as software, firmware, or other computer-readable or computer-executable instructions, that embodies any one or more of the methodologies or functions described herein. The instructions can also reside, completely or at least partially, within the memory 504, processor(s) 512, and/or communication interface(s) 514 during execution thereof by the computing device 502. The memory 504 and the processor(s) 512 also can constitute machine readable media 524.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computing system, comprising:
one or more processors;
at least one communication interface; and
memory storing a user profile and computer-executable instructions,
wherein the user profile indicates campaign data associated with a user, the campaign data comprising:
transfer criteria, associated with a campaign, that defines:
an activity type, and
an activity value per individual unit of the activity type that the user engages in, wherein the individual unit is an individual instance of the user engaging in the activity type or a particular duration of the user engaging in the activity type;
source account data associated with at least one source account; and
destination account data associated with at least one destination account, and wherein the computer-executable instructions, when executed by the one or more processors, cause the one or more processors to perform operations comprising:
receiving, via the at least one communication interface, user activity data associated with the user from one or more data sources, wherein:
the user activity data is associated with the activity type, and indicates an amount of units of the activity type that the user has engaged in during a period of time,
the one or more data sources comprises at least one user device associated with the user,
a transfer platform application executing on the at least one user device is configured to obtain the user activity data from one or more other applications executing on the at least one user device, and
the transfer platform application is configured to transmit the user activity data to the one or more processors;
determining a transfer amount based on:
the amount of units, of the activity type, indicated by the user activity data, and
the activity value, per the individual unit of the activity type, indicated by the transfer criteria; and
causing a transfer, of the transfer amount, from the at least one source account to the at least one destination account.

2. The computing system of claim 1, wherein at least one of the activity type or the activity value is set based on user input provided by the user.

3. The computing system of claim 1, wherein:
the one or more data sources further comprises a data source platform that maintains at least a portion of the user activity data, and
the at least the portion of the user activity data:
indicates usage of the data source platform by the user or in association with the user, or
is received by the data source platform from another source.

4. The computing system of claim 1, wherein:
the memory stores a campaign repository of data associated with a plurality of campaigns,
the operations further comprise displaying at least a portion of the data associated with the plurality of campaigns in a user interface, and
the campaign is selected by the user, from among the plurality of campaigns, via the user interface.

5. The computing system of claim 1, wherein at least one account, of the at least one source account or the at least one destination account, comprises:
- a user account associated with the user,
- a data source platform account associated with a data source platform, or
- a third party account associated with a third party.

6. A computer-implemented method, comprising:
- determining, by one or more processors, and based on campaign data associated with a user, transfer criteria for a campaign, wherein the transfer criteria indicates:
  - an activity type, and
  - an activity value per individual unit of the activity type that the user engages in, wherein the individual unit is an individual instance of the user engaging in the activity type or a particular duration of the user engaging in the activity type;
- receiving, by the one or more processors via a network, user activity data associated with the user from one or more data sources, wherein:
  - the user activity data is associated with the activity type, and indicates an amount of units of the activity type that the user has engaged in during a period of time,
  - the one or more data sources comprises at least one user device associated with the user,
  - a transfer platform application executing on the at least one user device is configured to obtain the user activity data from one or more other applications executing on the at least one user device, and
  - the transfer platform application is configured to transmit the user activity data to the one or more processors;
- determining, by the one or more processors, a transfer amount based on:
  - the amount of units, of the activity type, indicated by the user activity data, and
  - the activity value, per the individual unit of the activity type, indicated by the transfer criteria;
- identifying, by the one or more processors, and based on the campaign data, at least one source account and at least one destination account; and
- causing, by the one or more processors, a transfer of the transfer amount from the at least one source account to the at least one destination account.

7. The computer-implemented method of claim 6, wherein:
- the one or more data sources further comprises a data source platform that maintains at least a portion of the user activity data, and
- the at least the portion of the user activity data:
  - indicates usage of the data source platform by the user or in association with the user, or
  - is received by the data source platform from another source.

8. The computer-implemented method of claim 6, wherein one of the at least one source account or the at least one destination account is a user account associated with the user.

9. The computer-implemented method of claim 6, wherein the at least one source account includes a data source platform account associated with a data source platform.

10. The computer-implemented method of claim 9, wherein:
- the at least one source account further includes a user account associated with the user,
- the at least one destination account is associated with one or more third parties,
- the data source platform matches donations from the user account to the one or more third parties in association with the campaign, and
- causing the transfer comprises causing a first transfer of a first portion of the transfer amount from the user account to the at least one destination account, and causing a second transfer of a second portion of the transfer amount from the data source platform account to the at least one destination account.

11. The computer-implemented method of claim 9, wherein the at least one destination account includes one or more third party accounts associated with one or more third parties.

12. One or more non-transitory computer-readable media storing computer-executable instructions that, when executed by one or more processors, cause the one or more processors to perform operations comprising:
- determining, based on campaign data associated with a user, transfer criteria for a campaign that indicates:
  - an activity type, and
  - an activity value per individual unit of the activity type that the user engages in, wherein the individual unit is an individual instance of the user engaging in the activity type or a particular duration of the user engaging in the activity type;
- receiving, via a network, user activity data associated with the user from one or more data sources, wherein:
  - the user activity data is associated with the activity type, and indicates an amount of units of the activity type that the user has engaged in during a period of time,
  - the one or more data sources comprises at least one user device associated with the user,
  - a transfer platform application executing on the at least one user device is configured to obtain the user activity data from one or more other applications executing on the at least one user device, and
  - the transfer platform application is configured to transmit the user activity data to the one or more processors;
- determining a transfer amount based on:
  - the amount of units, of the activity type, indicated by the user activity data, and
  - the activity value, per the individual unit of the activity type, indicated by the transfer criteria;
- identifying, based on the campaign data, at least one source account and at least one destination account; and
- causing a transfer of the transfer amount from the at least one source account to the at least one destination account.

13. The one or more non-transitory computer-readable media of claim 12, wherein at least one of the activity type or the activity value is set based on user input provided by the user.

14. The one or more non-transitory computer-readable media of claim 12, wherein:
- the one or more data sources further comprises a data source platform that maintains at least a portion of the user activity data, and
- the at least the portion of the user activity data:
  - indicates usage of the data source platform by the user or in association with the user, or
  - is received by the data source platform from another source.

15. The one or more non-transitory computer-readable media of claim 12, wherein at least one account, of the at least one source account or the at least one destination account, comprises:
- a user account associated with the user,
- a data source platform account associated with a data source platform, or
- a third party account associated with a third party.

16. The computing system of claim 1, wherein:
- the at least one destination account comprises a user account of the user, and
- the transfer is from the at least one source account to the user account of the user.

\* \* \* \* \*